United States Patent
Mathew et al.

(10) Patent No.: US 12,524,318 B1
(45) Date of Patent: Jan. 13, 2026

(54) SYSTEMS, METHODS, AND MEDIA FOR PERFORMING A FAILOVER TECHNIQUE FOR ONE OR MORE DATA STREAMING APPLICATIONS EXECUTING IN A CLOUD COMPUTING ENVIRONMENT

(71) Applicant: FMR LLC, Boston, MA (US)

(72) Inventors: Jerry Mathew, Cary, NC (US); Rajeev Devarakonda, Frisco, TX (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 19/046,684

(22) Filed: Feb. 6, 2025

(51) Int. Cl.
  *G06F 11/20* (2006.01)
  *G06F 11/07* (2006.01)

(52) U.S. Cl.
  CPC ...... *G06F 11/2025* (2013.01); *G06F 11/0757* (2013.01); *G06F 11/2023* (2013.01); *G06F 11/2028* (2013.01); *G06F 11/2038* (2013.01); *G06F 11/2048* (2013.01); *G06F 2201/865* (2013.01)

(58) Field of Classification Search
  CPC ............. G06F 11/2025; G06F 11/0757; G06F 11/2023; G06F 11/2028; G06F 11/2038; G06F 11/2048; G06F 2201/865
  See application file for complete search history.

(56) References Cited

U.S. PATENT DOCUMENTS

| | | | | |
|---|---|---|---|---|
| 10,891,205 B1* | 1/2021 | Trulli, Jr. | ............ | G06F 11/2079 |
| 2013/0212205 A1* | 8/2013 | Flockhart | ............ | G06F 11/2097 709/248 |
| 2014/0095925 A1* | 4/2014 | Wilson | ................ | G06F 11/2038 714/E11.089 |
| 2015/0381407 A1* | 12/2015 | Wang | .................. | H04L 41/0668 370/221 |
| 2016/0092322 A1* | 3/2016 | Nosov | ................ | G06F 11/2007 714/4.11 |
| 2019/0102266 A1* | 4/2019 | Park | .................... | G06F 11/1658 |
| 2020/0028731 A1* | 1/2020 | Luo | ..................... | H04L 41/0668 |
| 2020/0142788 A1* | 5/2020 | Hu | ........................ | G06F 9/5077 |
| 2020/0186410 A1* | 6/2020 | Osawa | ............... | G06F 11/0709 |
| 2020/0244726 A1* | 7/2020 | Gupta | .................... | H04L 67/61 |
| 2020/0310928 A1* | 10/2020 | Neichev | ............. | G06F 11/2038 |
| 2021/0240560 A1* | 8/2021 | Ping | ....................... | G06F 3/0665 |
| 2021/0271558 A1* | 9/2021 | Kumarasamy | ...... | G06F 11/3006 |

(Continued)

*Primary Examiner* — Marc Duncan
*Assistant Examiner* — Michael Xu
(74) *Attorney, Agent, or Firm* — Cesari and McKenna, LLP

(57) ABSTRACT

Techniques are provided for performing a failover for one or more streaming data applications executing in a cloud computing environment. An active application may actively communicate with a logical region of the cloud computing environment. A corresponding standby application may operate in standby mode with a different logical region. The active application and its standby application may each monitor the health of the logical region and the different logical region by polling respective health status applications. When it is determined that the logical region has failed and the different logical region is healthy, the active application may transition to standby mode and the standby application may transition to active mode to actively communicate with the different logical region. When it is determined that the logical region is healthy again, the applications may switch back to their initial modes.

20 Claims, 9 Drawing Sheets

(56) References Cited

U.S. PATENT DOCUMENTS

| | | | |
|---|---|---|---|
| 2022/0091947 A1* | 3/2022 | Kothari | G06F 11/2092 |
| 2023/0244578 A1* | 8/2023 | Nachiappan | G06F 11/328 |
| | | | 714/4.11 |
| 2024/0004687 A1* | 1/2024 | Babarjung | G06F 9/45558 |
| 2024/0054057 A1* | 2/2024 | Awasthi | G06F 11/2025 |
| 2024/0126638 A1* | 4/2024 | Narendra | G06F 9/45558 |
| 2024/0264912 A1* | 8/2024 | Awasthi | G06F 11/2025 |

* cited by examiner

SYSTEMS, METHODS, AND MEDIA FOR PERFORMING A FAILOVER TECHNIQUE FOR ONE OR MORE DATA STREAMING APPLICATIONS EXECUTING IN A CLOUD COMPUTING ENVIRONMENT

BACKGROUND

Technical Field

The present disclosure relates generally to cloud computing environments, and more specifically to techniques for performing a failover for one or more data streaming applications executing in a cloud computing environment.

Background Information

Cloud computing is a computing architecture that provides on-demand access to computing resources (e.g., servers, storage, software applications, etc.) over the internet. Instead of owning and managing physical infrastructure, enterprises leverage third-party platforms that are responsible for managing the physical infrastructure that host the enterprises' applications. These platforms offer computing services that prioritize flexibility, scalability, and redundancy, while minimizing downtime of the hosted applications. The cloud computing model allows enterprises to focus on their applications, which are hosted on third-party cloud platforms, rather than on managing and maintaining the underlying hardware of the cloud computing environment.

Producer and consumer streaming applications are common and critical types of applications in cloud ecosystems. A producer application may generate data that is provided to a server (i.e., broker) of the cloud computing environment, while a consumer application may obtain the generated data from the server of the cloud computing environment to perform one or more functions, e.g., generate an alert that is transmitted over a network to a client device. Cloud computing platforms enable seamless interaction between these streaming applications using APIs, load balancers, and message brokers, ensuring both reliability and scalability.

Conventional cloud failover mechanisms can further enhance reliability in the cloud environment. For example, when a producer and/or consumer application fails, a monitoring system may detect the issue and redirect requests to redundant instances of a different availability zone (AZ) within the same region.

In the event of a region failure according to conventional techniques, applications and their dependencies (e.g., databases, external application program interfaces (APIs), authentication and identity services, etc.) are typically moved to a different, healthy region through pre-configured disaster recovery strategies, for example. When a failure is detected, cloud platforms often employ a routing technique to redirect incoming traffic to the backup region. Cloud services may also provision applications, databases, and other critical resources in the secondary region, leveraging mechanisms like cross-region data replication to ensure consistency. This allows the application to resume operations in the backup region with minimal disruption.

A key challenge with conventional failover techniques is the time it takes to activate applications and their dependencies in the backup region, which is crucial for meeting Recovery Time Objectives (RTOs). If the activation process cannot be completed within the defined RTO, the application will fail to meet disaster recovery requirements. Consequently, this delay renders the application vulnerable and unable to ensure continuity in the event of a failure. Ensuring that failover mechanisms are capable of meeting RTO standards is a critical consideration for effective disaster recovery planning. Therefore, in many instances, conventional failover techniques are not suitable for applications with stringent RTO requirements.

SUMMARY

Techniques are provided for performing a failover for one or more streaming applications executing in a cloud computing environment. Specifically, an active application and its corresponding standby application may each monitor the health of two different logical regions of a cloud computing environment and switch modes to implement a failover technique as will be described in further detail below.

A processor (e.g., a resilience module executed by the processor) may update a configuration file of an active application, which is actively communicating with a logical region of a cloud computing environment, with metadata of a resilience library plugin. At runtime, the resilience library plugin for the active application may be loaded into application memory. Once loaded into memory, the plugin may be initialized and integrated in the active application's execution sequence. Based on the execution of the resilience library plugin, a corresponding standby application is generated that operates in standby mode with a different logical region, e.g., different from the logical region the active application is actively communicating with. In an embodiment, the active application and its corresponding standby application are streaming applications.

Additionally, and based on the execution, the active application and its standby application may each monitor the health of the logical region and the different logical region. Specifically, the active and standby applications may poll a health status application for the logical region to monitor the health of the logical region. Additionally, the active and standby applications may poll a different health status application for the different logical region to monitor the health of the different logical region.

The active application and the standby application may determine that the logical region has failed when a heartbeat message is not received from the health status application in a predetermined amount of time. Moreover, the active application and the standby application may determine that the different logical region is healthy when a heartbeat message is received from the different health status application in a predetermined amount of time.

When the logical region has failed and the different logical region is healthy, the active application may transition to standby mode and the standby application may transition to active mode to actively communicate with the different logical region. When it is determined that the logical region is healthy again, the applications may switch back to their initial modes.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
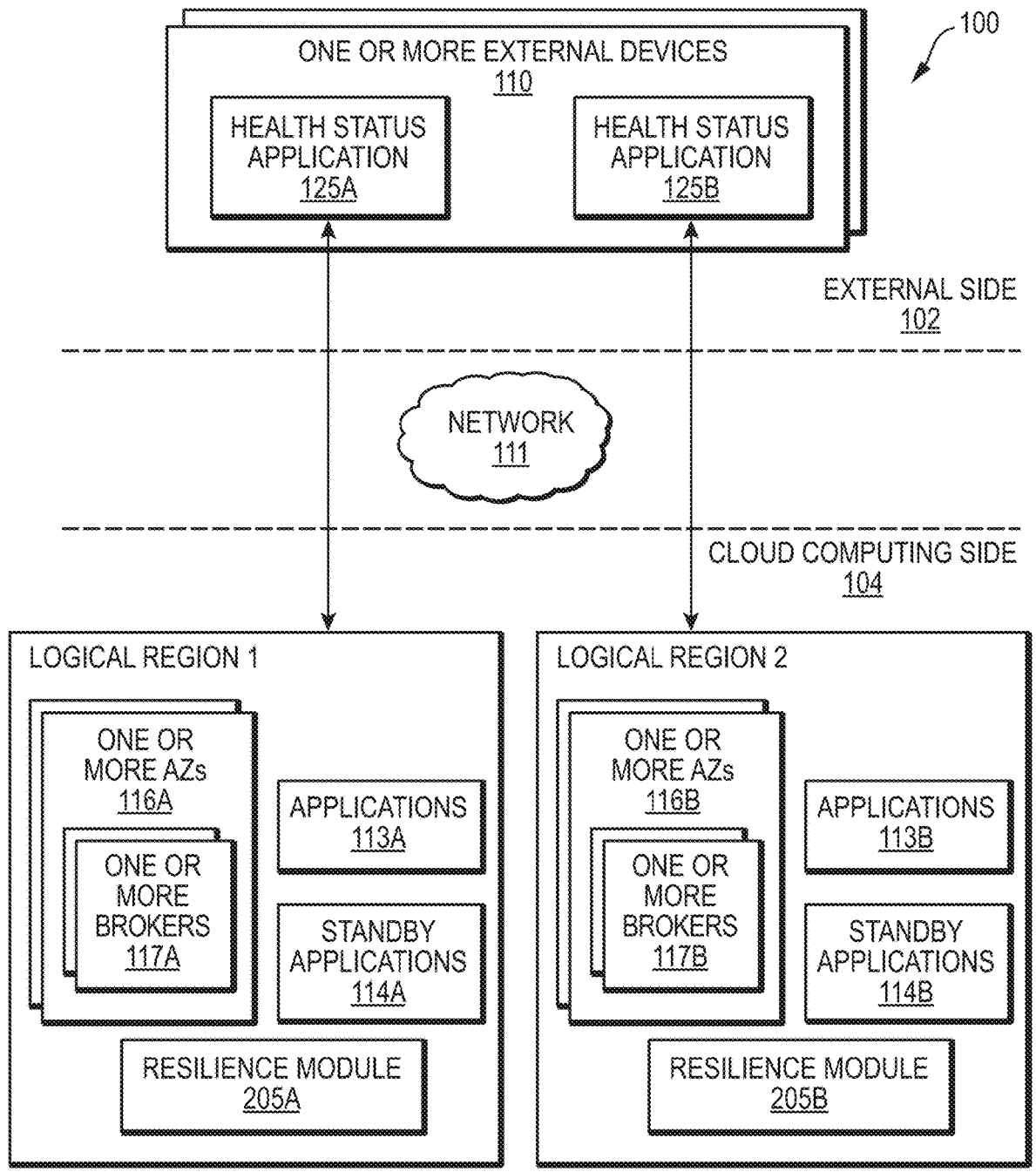
FIG. 1 is a high-level block diagram of an example system environment according to one or more embodiments as described herein.

FIG. 1 is a high-level block diagram of an example system environment 100 according to one or more embodiments as described herein. The system architecture 100 may be divided into an external side 102 that includes one or more external devices 110 that are local to end users, and cloud computing side 104 that is remote to the end users. As used herein, the term "external" of external side 102 is used to indicate that the one or more external devices 110 are external to and not executing on the cloud computing side 104. Devices of external side 102 and cloud computing side 104 may communicate over network 111.

In an embodiment, each external device 110, which may also be referred to as a client device, may include processors, memory, a display screen, and/or other hardware (not shown) for executing software, storing data, and/or displaying information. The one or more external devices 110 may provide a variety of user interfaces and non-processing intensive functions.

For example, external device 110 may provide a user interface for receiving user input and displaying output according to the one or more embodiments as described herein. The user interface can be a graphical user interface or a command line interface. In an embodiment, the external device 110 may be a server, a workstation, a platform, a mobile device, a network host, or any other type of computing device.

The external device 110 may be operated by affiliates of an enterprise. In an embodiment, the enterprise is a financial services institution. The affiliates may include employees and/or customers of the enterprise. The external device 110 may communicate with cloud computing side 104 over network 111. For example, the external device 110 may interact with active applications executing on cloud computing side 104. In an embodiment, the external device 110 may access the cloud computing side 104 using a web-based dashboard, command-line interface (CLI), an application programming interface (API), etc.

One or more external devices 104 may include health status applications 125. A health status application 125 may monitor the health of one logical region of cloud computing side 104. For example, and as will be described in further detail below, health status application 125A may monitor the health of logical region 1 of cloud computing side 104, while health status application 125B may monitor the health of logical region 2 of cloud computing side 104.

Cloud computing side 104 may be managed by a cloud service provider. As used herein, cloud computing side 104 may be referred to as cloud computing environment 104, cloud ecosystem 104, and/or cloud-based computing environment 104.

Cloud computing side 104 includes logical region 1 and logical region 2. Each logical region may represent a physical geographical area where different cloud components (e.g., brokers 116, applications 113, and standby applications 114) are deployed and maintained. For simplicity and ease of understanding, cloud computing side 104 only includes two logical regions. However, it is expressly contemplated that cloud computing side 104 may include any number of a plurality of logical regions.

As depicted in FIG. 1, logical region 1 includes one or more AZs 116A, while region 2 includes one or more AZs 116B. While a region may represent the broader geographical areas where particular cloud components, i.e., cloud resources, are deployed and maintained, AZs of the region may be thought of as isolated locations within a region that provide redundancy and fault tolerance. For example, and in an embodiment, AZs of the same region are located in close proximity to each other but are physically separate. This allows for risk mitigation that might be associated with disasters such as, but not limited to, power outages, earthquakes, etc.

As further depicted in FIG. 1, AZs 116A of logical region 1 include one or more brokers 117A, while AZs 116B of logical region 2 include one or more brokers 117B. A broker 117 may be a server that acts as an intermediary between applications that are active, e.g., applications that are in active mode and not in standby mode. For example, broker 117 may be responsible for receiving, storing, and routing between producer applications (e.g., producer streaming applications) and consumer application (e.g., consumer streaming applications). Specifically, broker 117 may receive messages related to a topic from a producer application. The broker 117 may manage the messages and route the messages to a consumer application that subscribes to the topic.

Logical region 1 further includes applications 113A, while logical region 2 includes applications 113B. Applications 113 are actively communicating (e.g., active mode) with brokers 117 for data communications. At times, and as described herein, an application may be referred to as an active application that transitions to standby mode. As such, and in this case, the application started as an active application and transitioned to a standby application.

Logical region 1 also includes standby applications 114A, while logical region 2 includes standby applications 114B. Standby applications 114 are applications that are not actively communicating with brokers 117 of the region. In an embodiment, a standby application 114 is a warm application that is (1) initialized or executing and not actively accepting or processing traffic, (2) in a standby mode, or (3) in a dormant state. At times, and as described herein, an application may be referred to as a standby application that transitions to active mode. As such, and in this case, the application started as an active application and transitioned to a standby application. In an embodiment, applications 113 and standby applications 114 are streaming applications.

According to the one or more embodiments as describe herein, and as will be described in further detail below, each of applications 113 may monitor the health status of the logical region it is actively communicating with and also monitor the health of a different logical region for its corresponding standby application 114. Each of applications 113 may transition from active mode to standby mode when it is determined that its logical region is in a failed state and the different logical region is in a healthy state.

Similarly, each of standby applications 114 may monitor the health status of the logical region it is operating in standby mode with, and may also monitor the health of a different logical region for its corresponding active application. Each of applications 114 may transition from the standby mode to the active mode when it is determined that its logical region is in the healthy state and the different logical region is in the failed state.

Each of logical regions 1 and 2 further include a resilience module 205. According to the one or more embodiments as described herein, and as described in further detail below, resilience module 205 of a logical region may update each application 113, which is actively communicating with the logical region, with a resilience library plugin. At runtime, each active application 113 can load its plugin. As a result of the execution of the plugin, a standby application 114 may be generated for failover interaction with a different logical region. As a further result of the execution of the plugin, the active application 113 and corresponding standby application 114 may each monitor the logical region and the different logical region.

Figure 2:
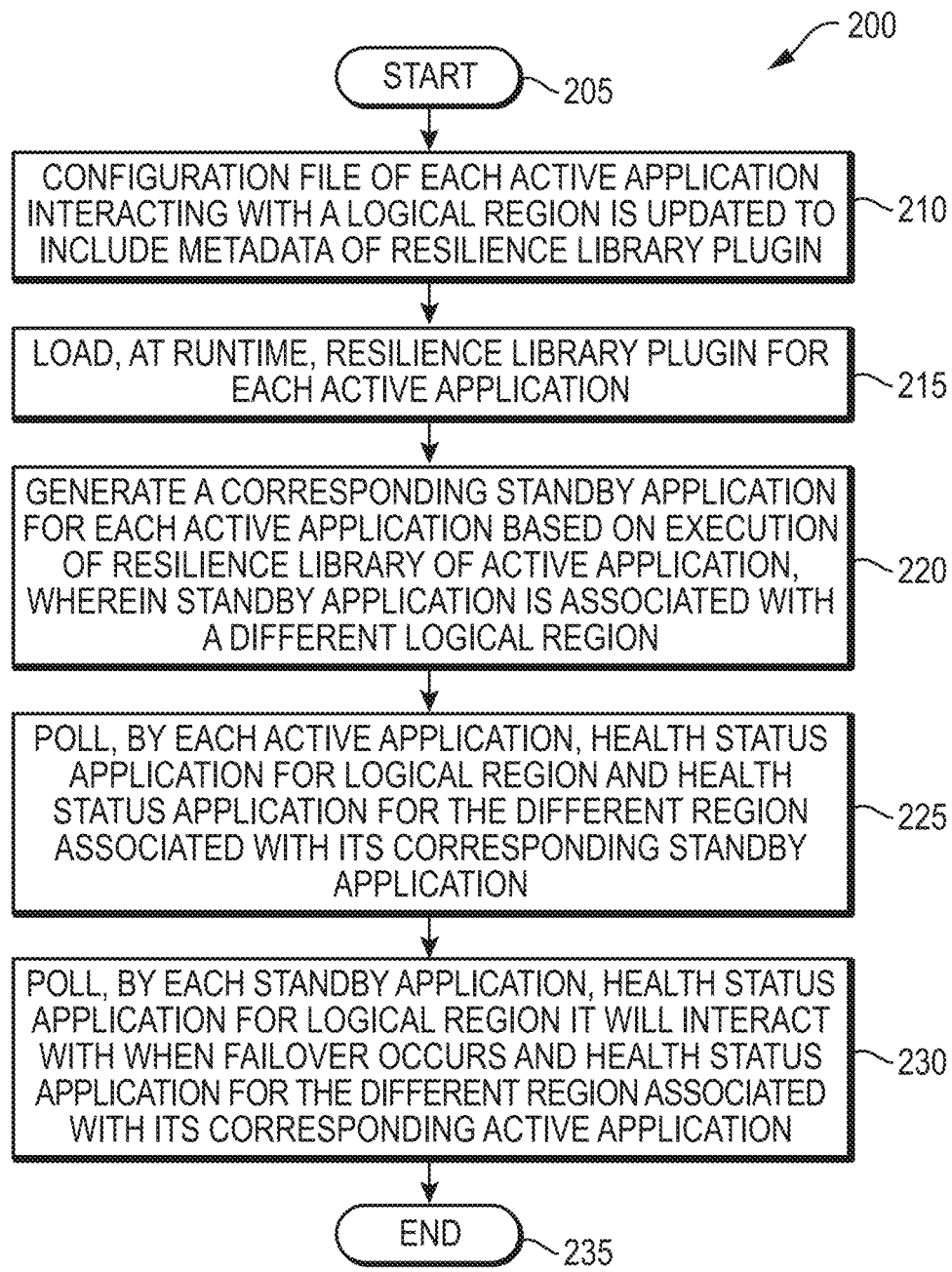
FIG. 2 is a flow diagram of a sequence of steps for generating, for an application actively communicating with a logical region, a standby application to interact with a different logical region, wherein the applications monitor the health of both regions according to the one or more embodiments as described herein.

FIG. 2 is a flow diagram of a sequence of steps for generating, for an application actively communicating with a logical region, a standby application to interact with a different logical region, wherein the applications monitor the health of both regions according to the one or more embodiments as described herein. The flow diagram of FIG. 2 may refer to cloud computing side 104 that includes two logical regions for simplicity and ease of understanding. However, it should be expressly understood that the one or more embodiments as described herein are applicable to cloud ecosystems that include many more logical regions and many more applications and standby applications. As such, the examples as described herein are for illustrative purposes only.

Procedure 200 starts at step 205 and continues to step 210. At step 210, a configuration file of each active application interacting with a logical region is updated to include metadata of a resilience library plugin.

Figure 3:
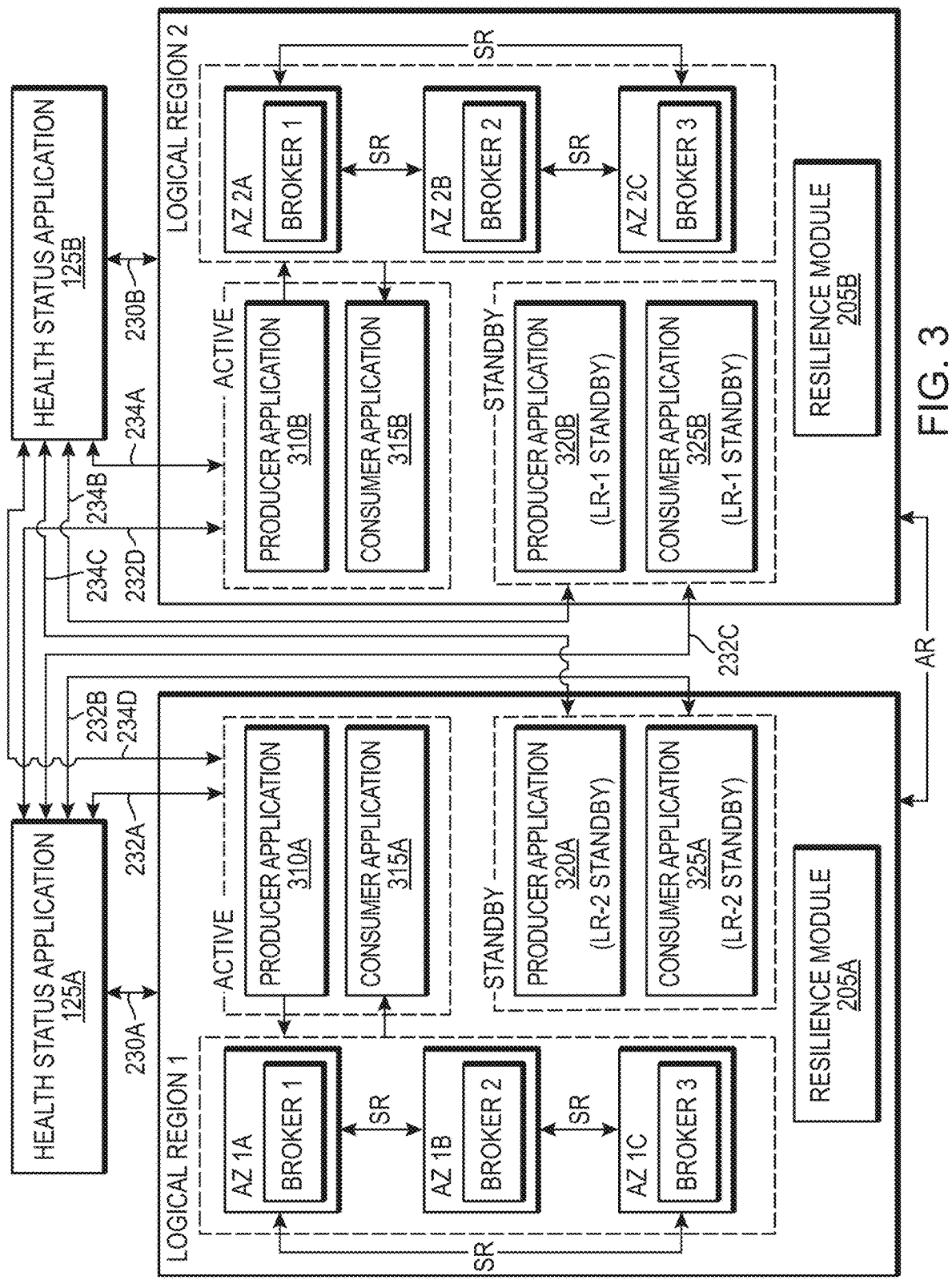
FIG. 3 is a schematic block diagram including active and standby applications of two logical regions and their interactions with health status applications according to the one or more embodiments as described herein.

FIG. 3 is a schematic block diagram including active and standby applications of two logical regions and their interactions with health status applications according to the one or more embodiments as described herein. With reference to FIG. 3, logical region 1 includes producer application 310A and consumer application 315A that are actively communicating with the brokers, e.g., brokers 1, 2, and 3, of logical region 1 for data communications. For the example in relation to FIG. 3, it should be understood that the active applications 113A of FIG. 1 include producer application 310A and consumer application 315A of FIG. 3. Further, and with reference to FIG. 3, logical region 2 includes producer application 310B and consumer application 315B that are actively communicating with the brokers of logical region 2 for data communications. For the example in relation to FIG. 3, it should be understood that the active applications 113B of FIG. 1 include producer application 310B and consumer application 315B of FIG. 3.

Therefore, and according to the one or more embodiments as described herein, each of producer application 310A, consumer application 315A, producer application 310B, and consumer application 315B are updated with a resilience library plugin. In an embodiment, resilience module 205 updates the configuration file of each active application 113 in the corresponding logical region. For example, resilience module 205A updates the configuration files of producer application 310A and consumer application 315A with metadata (e.g., name, location, and/or parameters) of the resilience library plugin. Similarly, resilience module 205B updates the configuration files of producer application 310B and consumer application 315B with metadata of the resilience library plugin. In an embodiment, resilience module 205 may update the configuration file of an active application when the active application is initialized in the logical region.

Referring back to FIG. 2, the procedure continues from step 210 to step 215. At step 215, the resilience library plugin for each active application is loaded at runtime. In an embodiment, an active application may read the configuration file (e.g., updated configuration file with metadata of the resilience library plugin) to locate the plugin (not shown) and then load the plugin into application memory. Once loaded into memory, the plugin may be initialized and integrated in the active application's execution sequence. Continuing with the Example of FIG. 3, each of producer application 310A and consumer application 315A of logical region 1 loads the resilience library plugin at runtime. Similarly, each of producer application 310B and consumer application 315B of logical region 2 loads the resilience library plugin at runtime.

Procedure 200 continues from step 215 to step 220. At step 220, a corresponding standby application is generated for each active application based on the execution of the resilience library of the active application, wherein the standby application is associated with a different logical region. For example, and as depicted in FIG. 3, producer application 310A of logical region 1 includes the loaded resilience library. When the producer application 310A executes, for example, the first time, the loaded resilience library may execute. The execution of the loaded resilience library within producer application 310A may cause a corresponding standby producer application to be generated that is associated with a different logical region.

For example, the resilience library plugin of producer application 310A of logical region 1 executes. This causes the generation of producer application 320B as depicted in FIG. 3, which is a standby application for logical region 2, e.g., a region that is different than logical region 1. Similarly, consumer application 325B as depicted in FIG. 3 is generated to operate in standby mode with logical region 2 based on the execution of the resilience library of consumer application 315A of logical region 1. Producer application 320B and consumer application 325B, which are both generated as standby applications, transition to active mode and interact with logical region 2 when logical region 1 fails as will be described in further detail below.

Producer Application 320A and consumer application 325A as depicted in FIG. 3, which are both standby applications for logical region 1, are similarly generated based on the executions of the resilience library plugins of producer application 210B and consumer application 315B that actively communicate with logical region 2. Producer application 320A and consumer application 325A, which are both generated as standby applications, transition to active mode and interact with logical region 1 when logical region 2 fails as will be described in further detail below.

Referring back to FIG. 2, the procedure 200 continues from step 220 to step 225. At step 225, each active application polls the health status application for its logical region and polls the health status application for the other region associated with its corresponding standby application. With reference to FIG. 3, producer application 310A and consumer application 315A, which actively communicate with logical region 1, each poll health status application 125A for the health status of logical region 1. Producer application 310A and consumer application 315A, which actively communicate with logical region 1, also each poll health status application 125B for the health status of logical region 2.

Similarly, producer application 310B and consumer application 315B, which actively communicate with logical region 2, each poll health status application 125B for the health status of logical region 2. Producer application 310B and consumer application 315B, which actively communicate with logical region 2, each also poll health status application 125A for the health status of logical region 1.

The procedure 200 continues from step 225 to step 230. At step 230, each standby application polls the health status application for its logical region and polls the health status application for the other region associated with its corresponding active application. With reference to FIG. 3, producer application 320A and consumer application 325A are in standby mode with logical region 1. Producer application 320A and consumer application 325A poll health status applications 125A and 125B for the health status of logical regions 1 and 2. Producer application 320B and consumer application 325B are in standby mode with logical region 2. Producer application 320B and consumer application 325B poll health status applications 125A and 125B for the health status of logical regions 1 and 2. Procedure 200 then ends at step 235.

Referring now to FIG. 3, the block diagram includes the discussed producer and consumer applications (e.g., active and standby) and health status applications. The arrows in FIG. 3 represent communication channels and the flow of data. The reference numbers of the communication channels are included for assisting in the explanation below and to differentiate between the arrows in FIG. 3.

As depicted in FIG. 3, logical region 1 includes AZs 1A, 1B, and 1C, each of which includes a broker. The "SR" is included to indicate that there is synchronous replication between the availability zones for data consistency between the availability zones. Logical region 1 includes producer application 310A and consumer application 315A, both of which are in the active mode and actively interacting with the brokers of logical region 1. This is indicated by the horizontal communication channels in logical region 1 and the dashed box with the term "active". Producer application 310A may provide messages to the brokers of logical region 1, while consumer application 315A may receive/obtain the provided messages from the brokers of logical region 1.

Logical region 1 further includes producer application 320A and consumer application 325A, both of which are in standby mode. This is indicated by the absence of communication channels between the applications (e.g., producer application 320A and consumer application 325A) and the brokers of logical region 1 and the dashed box with the term "standby". As described above in relation to FIG. 2, producer application 320A and consumer application 325A may be generated based on the execution of resilience library plugins of producer application 310B and consumer application 315B that actively communicate with logical region 2.

As depicted in FIG. 3, health status application 125A monitors the health of logical region 1 as indicated by communication channel 230A. In an embodiment, health status application 125A may check health by making an administrative call to the streaming broker (e.g., broker 1, broker 2, and/or broker 3 of logical region 1).

Accordingly, the health status application 125A may determine that logical region 1 is in a healthy state when the administrative call response received indicates healthy via communication channel 230A within a predetermined time period (e.g., N seconds). Alternatively, the health status application 125A may determine that logical region 1 is in a failed state when the administrative call response indicates unhealthy via communication channel 230A within the predetermined time period.

In an embodiment, a logical region is determined to be in a failed state when at least two brokers of the logical region are determined to have failed.

As described above in relation to FIG. 2, each of producer application 310A and consumer application 315A, which actively communicate with logical region 1, monitor the health of logical region 1 and logical region 2 based on the execution of the resilience library plugin within producer application 310A and consumer application 315A. For example, producer application 310A may send a polling command to health status application 125A via communication channel 232A. The producer application 310A may determine that logical region 1 is in a healthy state if it receives a response (e.g., heartbeat message) from health status application 125A via communication channel 232A within a predetermined time period (e.g., N seconds). The producer application 310A may determine that logical region 1 is in a failed state if it does not receive a response from health status application 125A via communication channel 232A within the predetermined time period.

Producer application 310A may also send a polling command to health status application 125B via communication channel 234D. The producer application 310A may determine that logical region 2 is in a healthy state if it receives a response from health status application 125B via communication channel 234D within the predetermined time period. The producer application 310A may determine that logical region 2 is in a failed state if it does not receive a response from health status application 125B via communication channel 234D within the predetermined time period.

Consumer application 315A, which actively communicates with logical region 1, may similarly determine the health status of logical regions 1 and 2 using communication channels 232A and 234D.

Producer application 320A and consumer application 325A are in standby mode with logical region 1. Producer application 320A and consumer application 325A may determine the health status of logical regions 1 and 2 as described above using communication channels 232B and 234C.

FIG. 3 further includes logical region 2. "AR" between logical regions 1 and 2 is included to indicate that asynchronous replication can take place between logical regions 1 and 2 for data consistency between logical regions 1 and 2. Logical region 2 is similarly configured to logical region 1 as described above. Further, producer application 310B and consumer application 315B, which are actively communicating with logical region 2, may determine the health status of logical regions 1 and 2 using communication channels 232D and 234A as described above. Moreover, producer application 320B and consumer application 325B, both of which are in standby mode, may determine the health status of logical regions 1 and 2 using communication channels 232C and 234B as described above.

As will be described in further detail below in relation to FIGS. 4 through 9, each active application 113 may transition from active mode to standby mode based on monitoring the health of its logical region and the other logical region for its corresponding standby application. Additionally, and as will be described in further detail below in relation to FIGS. 4 through 9, each standby application 114 may transition from standby mode to the active mode based on a failover and monitoring the health of its logical region and the other logical region for its corresponding standby application.

Figure 4:
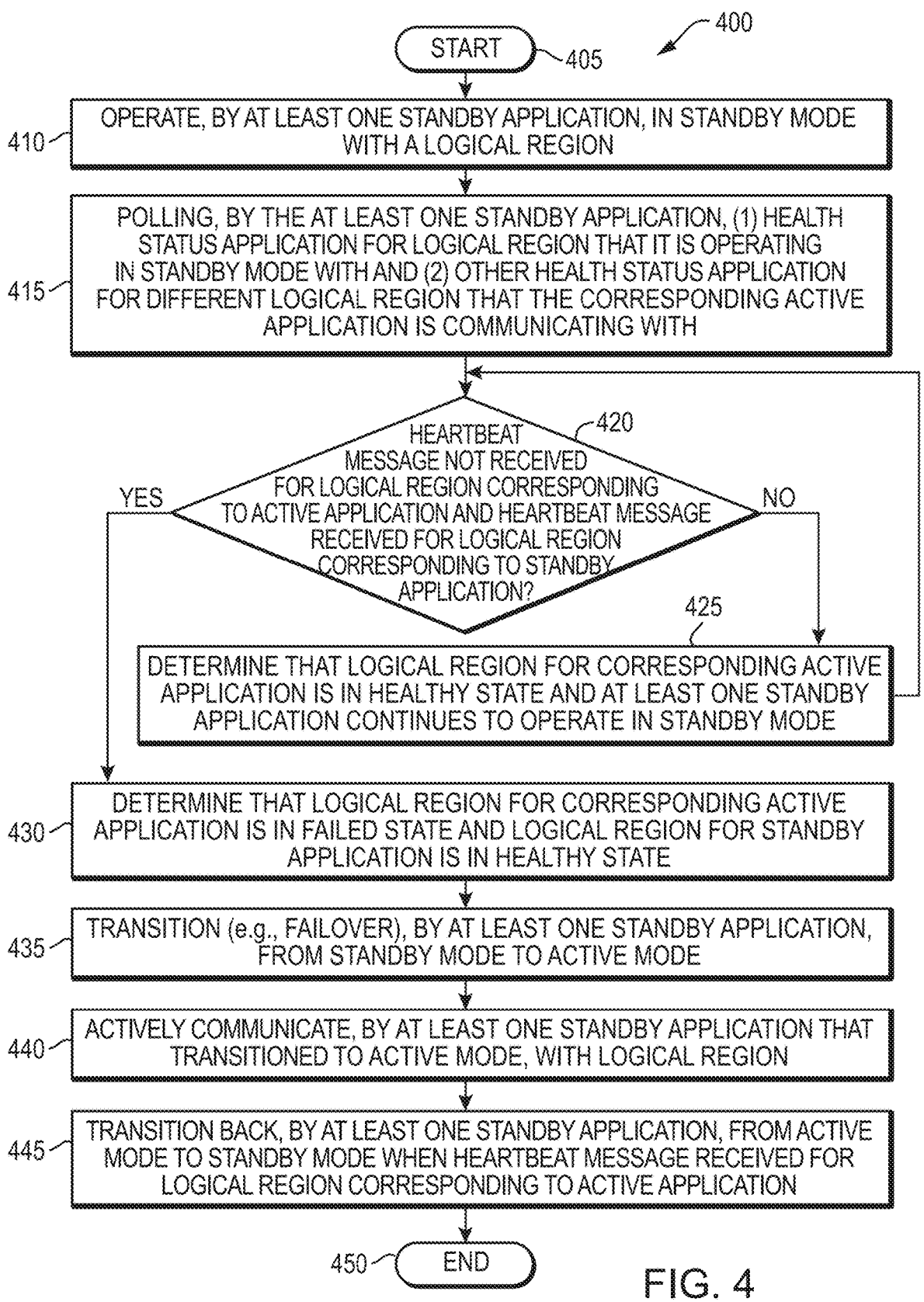
FIG. 4 is a flow diagram of a sequence of steps for the operation of a standby application based on a failure of a logical region in a cloud computing environment according to the one or more embodiments as described herein.
Figure 7:
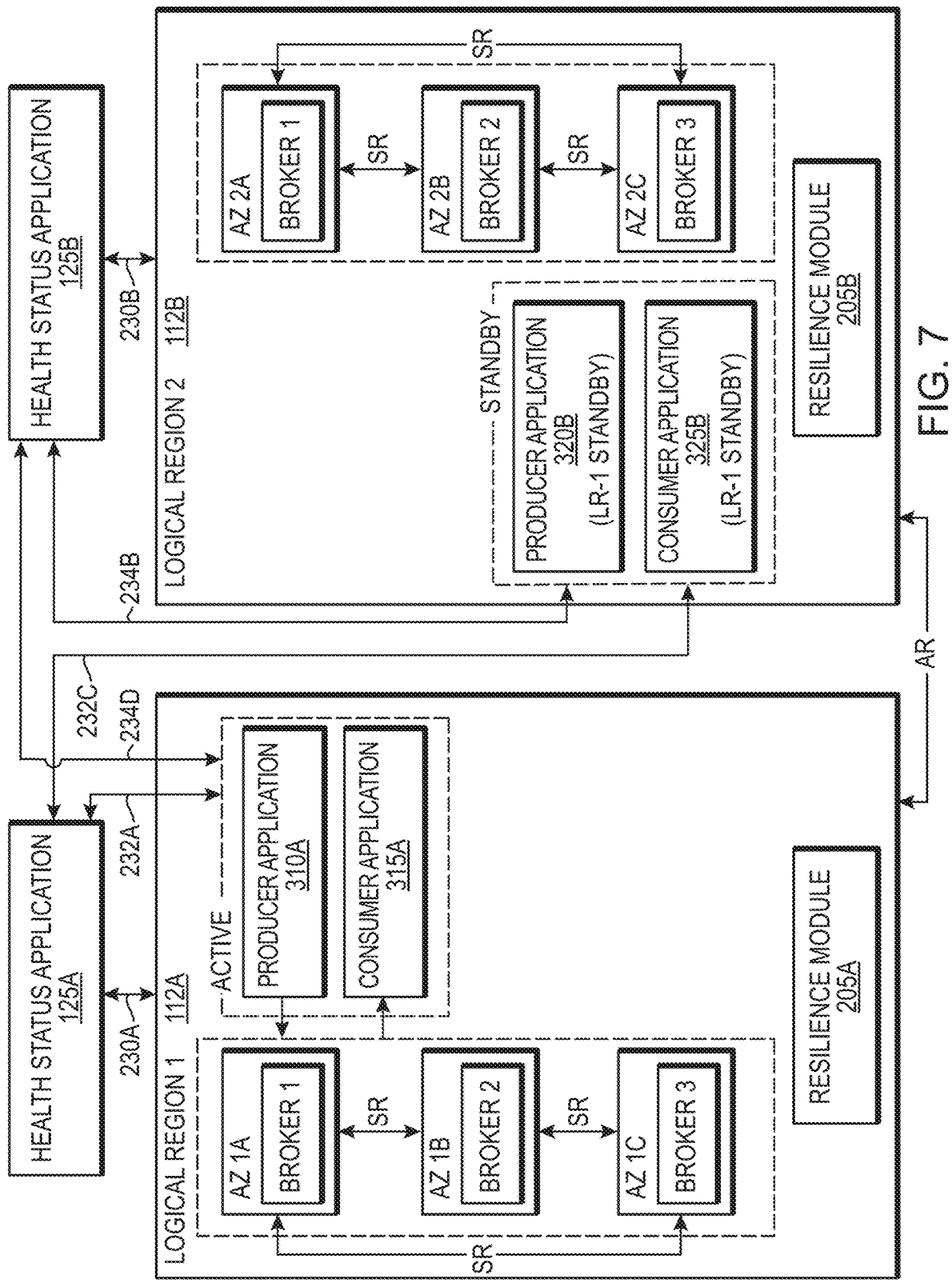
FIG. 7 is a simplified version of FIG. 3 with two active and two standby applications prior to a failure of a logical region according to the one or more embodiments as described herein.
Figure 8:
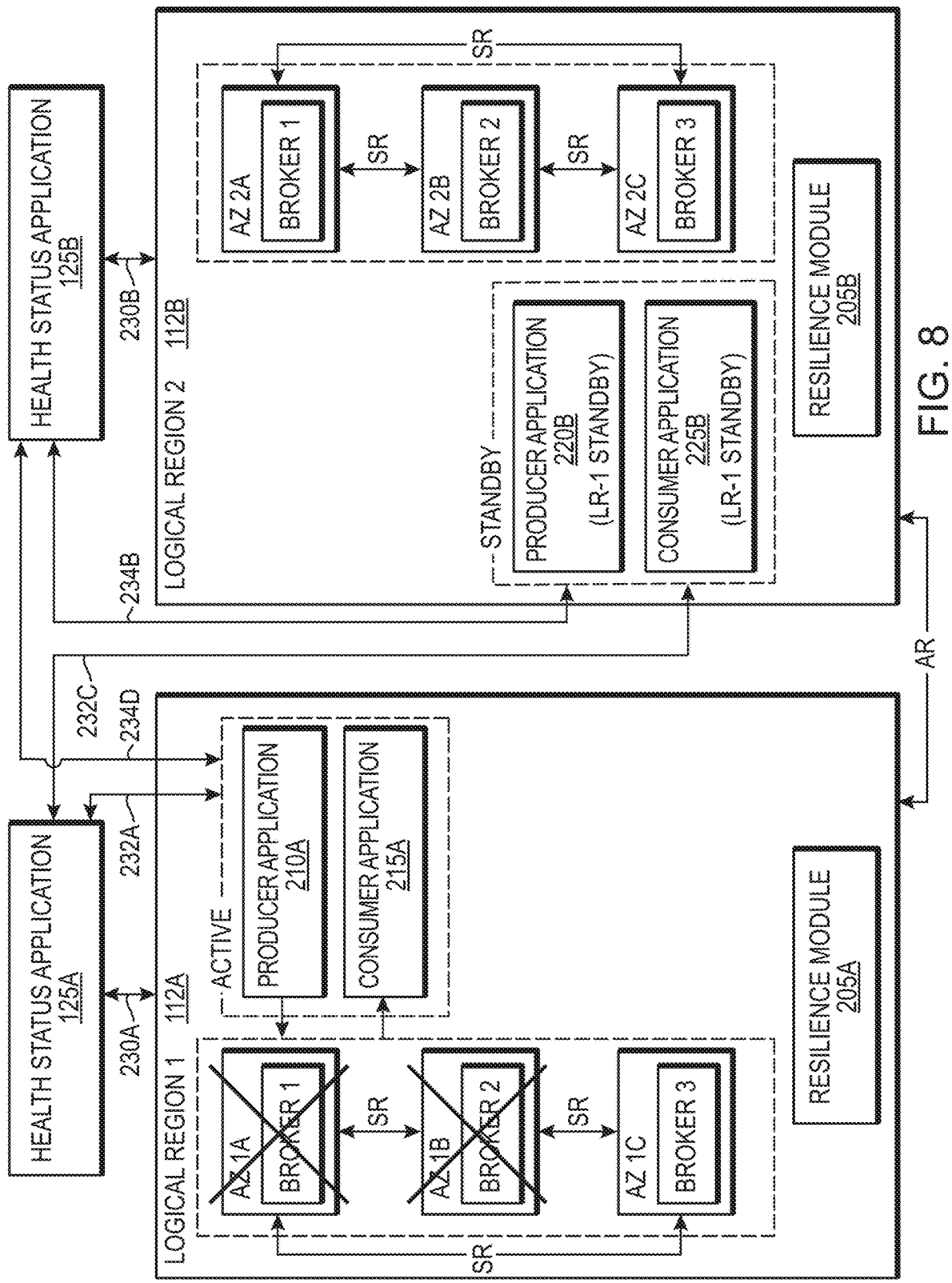
FIG. 8 is the simplified version of FIG. 3 at a point in time when a logical region fails and before a failover technique is implemented according to the one or more embodiments as described herein.
Figure 9:
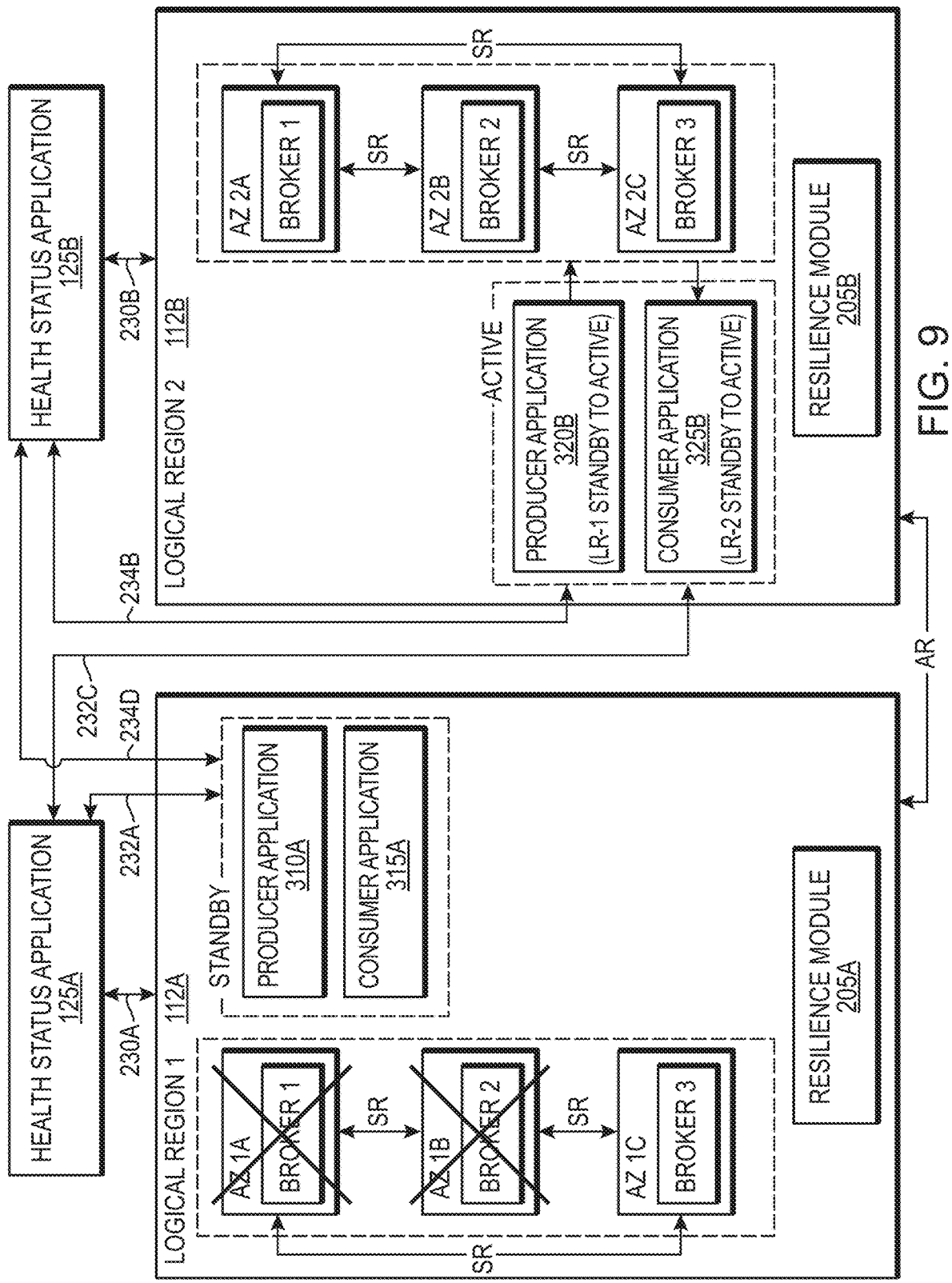
FIG. 9 is the simplified version of FIG. 3 after a logical region has failed and the failover technique has been implemented according to the one or more embodiments as described herein.

FIG. 4 is a flow diagram of a sequence of steps for the operation of a standby application based on a failure of a logical region in a cloud computing environment according to the one or more embodiments as described herein. The flow diagram of FIG. 4 will refer to the block diagrams of FIGS. 7 through 9 for implementing a failover when logical region 1 is in a failed state. FIGS. 7 through 9 are similar to the block diagram of FIG. 3. However, for simplicity and ease of understanding, FIGS. 7 through 9 only include the applications and communication channels necessary for the discussion of the failure of logical region 1.

Specifically, FIGS. 7 through 9 only include producer application 310A of logical region 1, consumer application 315A of logical region 1, producer application 320B of logical region 2, and consumer application 325B of logical region 2. Further, FIGS. 7 through 9 only include the communication channels corresponding to these applications. As such, the applications (e.g., producer application 310B, consumer application 315B, producer application 320A, and consumer application 325A) and their communication channels necessary for the discussion of the failure of logical region 2, which are included in FIG. 3, are omitted from FIGS. 7 through 9 for simplicity and ease of understanding. Although producer application 310B, consumer application 315B, producer application 320A, and consumer application 325A are not explicitly discussed in detail in relation to the figures below, it is expressly contemplated that these applications would operate in a similar manner based on the description below.

Procedure 400 starts at step 405 and continues at step 410. At step 410, at least one standby application operates in standby mode with a logical region. FIG. 7 is a simplified version of FIG. 3 with two active and two standby applications prior to a failure of a logical region according to the one or more embodiments as described herein. As depicted in FIG. 7, producer application 320B operates in standby mode with logical region 2 for producer application 310A that is actively communicating with logical region 1. Similarly, consumer application 325B operates in standby mode with logical region 2 for consumer application 315A that is actively communicating with logical region 1. In an embodiment, producer application 320B and consumer application 325B, which operate in standby mode, are warm applications.

Procedure 400 continues from step 410 to step 415. At step 415, the at least one standby application polls (1) the health status application for the logical region that it is operating in standby mode with and (2) the other health status application for the different logical region that the corresponding application is actively communicating with.

Continuing with the example as depicted in FIG. 7, producer application 320B operates in standby mode with logical region 2 for producer application 310A that is actively communicating with logical region 1. Therefore, producer application 320B may poll the health status application 125B for the health of logical region 2. Producer application 320B may also poll the health status application 125A for the health of logical region 1. Producer application 320B may poll health status applications 125A and 125B in a similar manner as described above in relation to step 230 of FIG. 2. Consumer application 325B, which operates in standby mode for consumer application 315A, would similarly poll health status applications 125A and 125B.

The procedure 400 continues from step 415 to step 420. At step 420, the at least one standby application determines if a heartbeat message is not received for the logical region corresponding to the active application and a heartbeat message is received for the logical region corresponding to the standby application. Continuing with the example of FIG. 7, the producer application 320B operating in the standby mode with logical region 2 determines if a heartbeat message is not received from health status application 125A for logical region 1. Producer application 320B may determine if the heartbeat message from health status application 125A is not received in a predetermined amount of time (e.g., N seconds). If the heartbeat message from health status application 125A is not received in the predetermined amount of time, producer application 320B may determine that logical region 1 is in a failed state. If the heartbeat message from health status application 125A is received in the predetermined amount of time, producer application 320B may determine that logical region 1 is in a healthy state.

Further, producer application 320B determines if a heartbeat message is received from health status application 125B for logical region 2. For example, if the heartbeat message from health status application 125B is received in the predetermined amount of time, producer application 320B may determine that logical region 2 is in a healthy state. If the heartbeat message from health status application 125B is not received in the predetermined amount of time, producer application 320B may determine that logical region 2 is in a failed state.

Consumer application 325B, which is operating in standby mode with logical region 2 for consumer application 315A, may similarly determine the health of logical regions 1 and 2.

If, for example, producer application 320B that is operating in standby mode determines that logical region 1 is in a healthy state at step 420, e.g., No at step 420, the procedure continues from step 420 to step 425. At step 425, the at least one standby application determines that the logical region for the corresponding active application is in a healthy state and the at least one standby application continues to operate in the standby mode. Continuing with the example of FIG. 7, when producer application 320B receives the heartbeat message from health status application 125A, the producer application 320B determines that logical region 1 is in a healthy state such that a failover is not required and the producer application 320B continues to operate in standby mode. Consumer application 325B would operate similarly.

The procedure continues from step 425 and reverts to step 420 such that the at least one standby application can continuously determine if the logical region corresponding to the active application is in the healthy state to determine if the standby application should continue to operate in standby mode.

If, however, producer application 320B that is operating in standby mode determines that logical region 1 is in a failed state and logical region 2 is in a healthy state, e.g., Yes at step 420, the procedure continues from step 420 to step 430. At step 430, the at least one standby application determines that the logical region for the corresponding active application is in a failed state and the logical region for the standby application is in the healthy state.

Continuing with the example of FIG. 7, when producer application 320B does not receive the heartbeat message from health status application 125A, the producer application 320B determines that logical region 1 is in a failed state. Further, when producer application 320B receives the heartbeat message from health status application 125B, the producer application 320B determines that logical region 2 is in a healthy state.

FIG. 8 is the simplified version of FIG. 3 at a point in time when a logical region fails and before a failover technique is implemented according to the one or more embodiments as described herein. As indicated in FIG. 8, logical region 1 is determined to have failed as indicated by the two X's included in logical region 1. In an embodiment, a logical region fails when at least two brokers of all the brokers in a logical region have been determined to fail. When less than two brokers of a logical region have been determined to have failed, the corresponding health status application sends a health response (e.g., heartbeat message) to the polling application. When at least two brokers of the logical region have been determined to have failed, the corresponding health status application does not send the health response (e.g., heartbeat message) to the polling application.

Referring back to FIG. 4, when logical region 1 is determined to be in a failed state and logical region 2 is determined to be in a healthy state, it is determined that a failover is required from logical region 1 to logical region 2 and the procedure continues from step 430 to step 435.

At step 435, the at least one standby application transitions from the standby mode to the active mode. Continuing with the example of FIG. 7, producer application 320B and consumer application 325B transition from the standby mode to the active mode as part of the failover technique. As will be described in further detail below in relation to the flow diagram of FIG. 5, the active applications (e.g., producer application 310A and consumer application 315A) transition from active mode to standby mode as part of the failover technique. In an embodiment, the configuration files are automatically modified to transition the standby applications that may be "warm" to active applications when it is determined that logical region 1 has failed and logical region 2 is healthy.

The procedure continues from step 435 to step 440. At step 440, the at least one standby application, which transitioned to active mode, actively communicates with the logical region. Continuing with the example of FIG. 7, producer application 320B and consumer application 325B transitioned from standby mode to active mode. Therefore, producer application 320B and consumer application 325B actively communicate with logical region 2 such that a failover is implemented from failed logical region 1 to healthy logical region 2. As such, the service of the producer/consumer application is transitioned from logical region 1 to logical region 2 to avoid an interruption in service. FIG. 9 is the simplified version of FIG. 3 after a logical region has failed and the failover technique has been implemented according to the one or more embodiments as described herein. Specifically, producer application 320B and consumer application 325B actively communicate with the brokers of logical region 2 as indicated by the horizontal channels in logical region 2.

Referring back to FIG. 4, the procedure continues from step 440 to step 445. At step 445, the at least one standby application transitions back from the active mode to the standby mode when a heartbeat message is received for the logical region corresponding to the active application. Continuing with the example, when producer application 320B and consumer application 325B receive a heartbeat message from health status application 125 for logical region 1, producer application 320B and consumer application 325B transition back to the standby mode for the failback technique as described herein. As such, producer application 320B and consumer application 325B operate in standby mode as depicted in FIG. 7. The procedure then ends at step 450.

Therefore, and as describe in relation to FIGS. 7 through 9, producer application 320B and consumer application 325B, both of which operate in standby mode with logical region 2, can switch from standby mode to active mode when the applications determine that logical region 1 is in a failed state and logical region 2 is in a healthy state. Further, producer application 320B and consumer application 325B can transition back to standby mode when the applications determine that logical region 1 has returned to a healthy state.

As will be described in relation to the flow diagram of FIG. 5, active applications in logical region 1 switch from active mode to standby mode when logical region 1 is in a failed state and logical region 2 is in a healthy state. Further, the active applications can switch back to the active mode when logical region 1 is determined to have returned to a healthy state.

Figure 5:
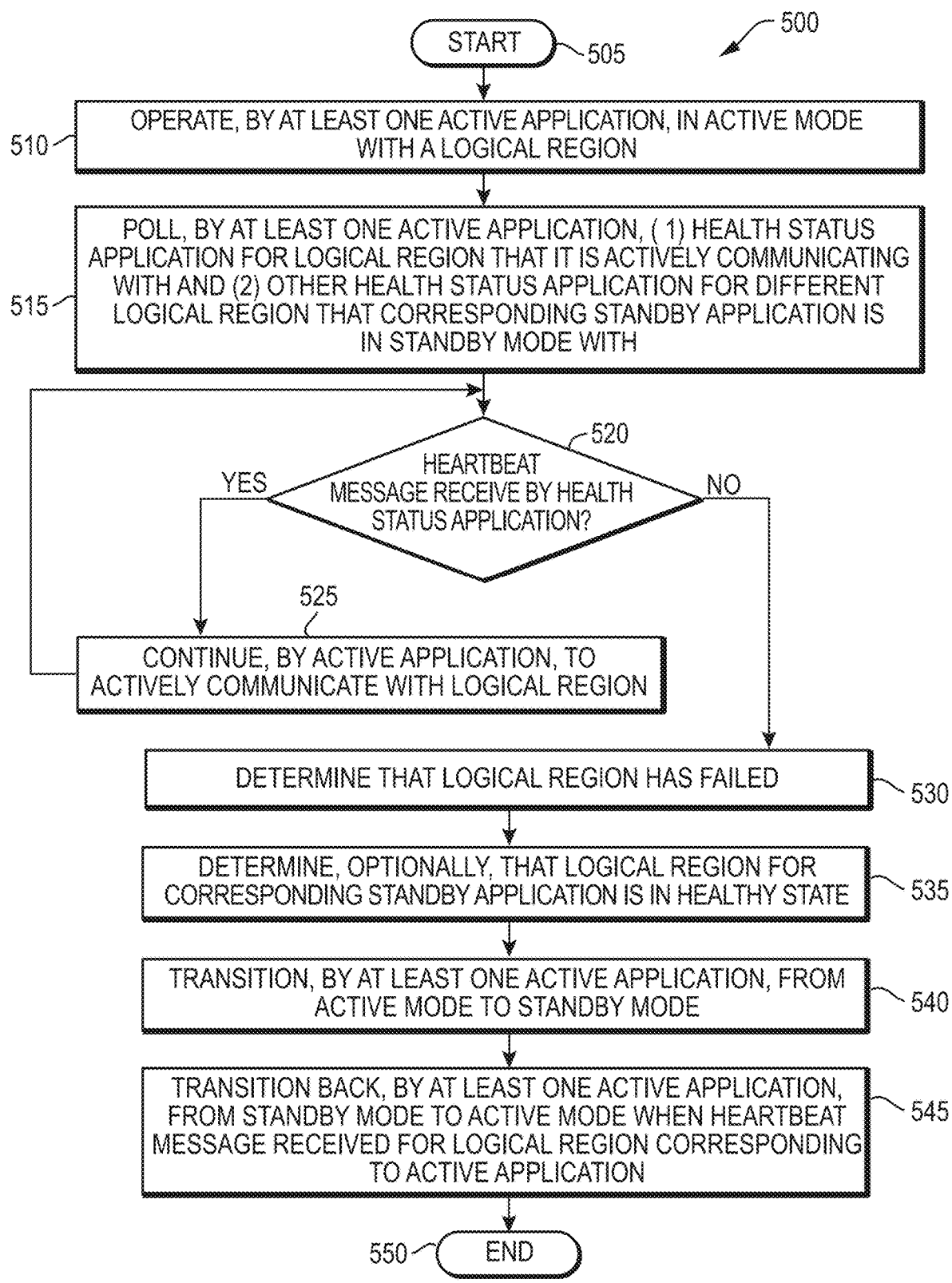
FIG. 5 is a flow diagram of a sequence of steps for the operation of an active application based on a failure of a logical region in a cloud computing environment according to the one or more embodiments as described herein.

FIG. 5 is a flow diagram of a sequence of steps for the operation of an active application based on a failure of a logical region in a cloud computing environment according to the one or more embodiments as described herein.

Procedure 500 starts at step 505 and continues at step 510. At step 510, at least one active application operates in active mode with a logical region. As depicted in FIG. 7, producer application 310A and consumer application 315A actively communicate with the brokers of logical region 1. As further depicted in FIG. 7, producer application 320B operates in standby mode with logical region 2 for producer application 310A. Similarly, consumer application 325B operates in standby mode with logical region 2 for consumer application 315A. In an embodiment, producer application 320B and consumer application 325B, which operate in standby mode, are warm applications.

Procedure 500 continues from step 510 to step 515. At step 515, the at least one active application polls (1) the health status application for the logical region that it is actively communicating with and (2) the other health status application for the different logical region that the corresponding standby application is in standby mode with.

Continuing with the example as depicted in FIG. 7, producer application 310A and consumer application 315A, both of which actively communicate with the brokers of logical region 1, poll health status applications 125A and 125B in a similar manner as described above in relation to step 225 of FIG. 2.

The procedure 500 continues from step 515 to step 520. At step 520, the at least one active application determines if a heartbeat message is received by the health status application for the logical region it is actively communicating with. Continuing with the example of FIG. 7, producer application 310A and consumer application 315A determine if a heartbeat message is received by health status application 125A for logical region 1 in a similar manner as described above in relation to step 420 of FIG. 4.

If, for example, producer application 310A that is actively communicating with logical region 1 receives a heartbeat message from health status application 125A in a predetermined amount of time (e.g., N seconds), producer application 310A determines that logical region 1 is in a healthy state and the procedure continues from step 520 to step 525. At step 525, the active application continues to actively communicate with the logical region. Therefore, in this example, the producer application 310A would continue to actively communicate with the brokers of logical region 1 in response to receiving the heartbeat message from health status application 125A. The procedure would revert back from step 525 to step 520 to determine if a heartbeat message is received in the next predetermined amount of time. Consumer application 315A that is actively communicating with logical region 1 would operate similarly. Therefore, an active application continues to actively communicate with its logical region while a heartbeat message is received during each consecutive predetermined time period.

If, however, a heartbeat message is not received by the health status application within the predetermined amount of time, the procedure continues from step 520 to step 530. At step 530, the at least one active application determines that the logical region is in a failed state. Continuing with the example, if producer application 310A does not receive the heartbeat message from health status application 125A, producer application 310A determines that logical region 1 is in a failed state at step 530. Consumer application 315A would operate in a similar manner. In an embodiment, all active applications and/or standby applications interacting with the same logical region are consistent in determining whether a logical region is in a healthy state or a failed state. As indicated in FIG. 8, logical region 1 is determined to have failed as indicated by the two X's included in logical region 1.

The procedure continues from step 530 to step 535 that is optional. At optional step 535, the at least one active application determines that the logical region corresponding to its standby application is in a healthy state. Continuing with the example of FIG. 7, producer application 310A determines that logical region 2, which corresponds to its standby application 320B, is in a healthy state. For example, producer application 310A may poll health status application 125B to determine if a heartbeat message is received in a predetermined amount of time. If the heartbeat message is received from health status application 125B in the predetermined amount of time, producer application 310A determines that logical region 2 is in a healthy state. Consumer application 315A may operate in a similar manner.

The procedure continues from step 535 to step 540. At step 540, the at least one active application transitions from the active mode to the standby mode. Continuing with the example of FIG. 7, producer application 310A and consumer application 315A transition from active mode to standby mode. In an embodiment, the configuration files for producer application 310A and consumer application 315A are automatically modified to transition the corresponding applications from active mode to standby mode. When producer application 310A and consumer application 315A are in standby mode, they do not actively communicate with the brokers of logical region 1. Instead, the producer application 310A and consumer application 315A are in standby mode and are "warm". In an embodiment, producer application 310A and consumer application 315A are warm and thus are (1) initialized or executing and not actively accepting or processing traffic, (2) in a standby mode, or (3) in a dormant state.

Therefore, and when logical region 1 fails, producer application 310A and consumer application 315A transition from active mode to standby mode as described in relation to the flow diagram of FIG. 5. Further, producer application 320B and consumer application 325B transition from standby mode (e.g., warm applications) to active mode to actively communicate with the brokers of logical region 2. As depicted in FIG. 9, producer application 310A and consumer application 315A are in standby mode as indicated with the omission of horizontal communication channels in logical region 1. Further, and as depicted in FIG. 9, producer application 320B and consumer application 325B actively communicate with the brokers of logical region 2 as indicated by the horizontal channels in logical region 2.

Advantageously, data processing and communication can be seamlessly shifted from a failed region to a healthy region to minimize downtime and maintain uninterrupted data communications across client devices 110 according to the one or more embodiments as described herein. By routing traffic to a healthy logical region, client devices 110 avoid service interruptions, which is particularly critical for streaming applications that must adhere to stringent Recovery Time Objective (RTO) standards. As such, the one or more embodiments as described herein provide an improvement to the existing technological field of handling failures in cloud computing environments. Therefore, the one or more embodiments as described herein are necessary rooted in addressing a problem rooted in computer technology, e.g., a problem explicitly encountered by cloud computing systems/environments.

Referring back to FIG. 5, the procedure continues from step 540 to step 545. At step 545, the at least one active application transitions from standby mode to active mode when a heartbeat message is received from its logical region. Continuing with the example, when producer application 310A and consumer application 315A receive a heartbeat message from health status application 125A in the predetermined amount of time, producer application 315A and consumer application transition from standby mode to active mode. For example, as depicted in FIG. 7, producer application 310A and consumer application 315A are in active mode and actively communicate with brokers of logical region 1. Further, it should be noted that when producer application 310A and consumer application 315A transition back to active mode, producer application 320B and consumer application 325B simultaneously transition back to standby mode with logical region 2 as depicted in FIG. 7. Procedure 500 then ends at step 550.

Figure 6:
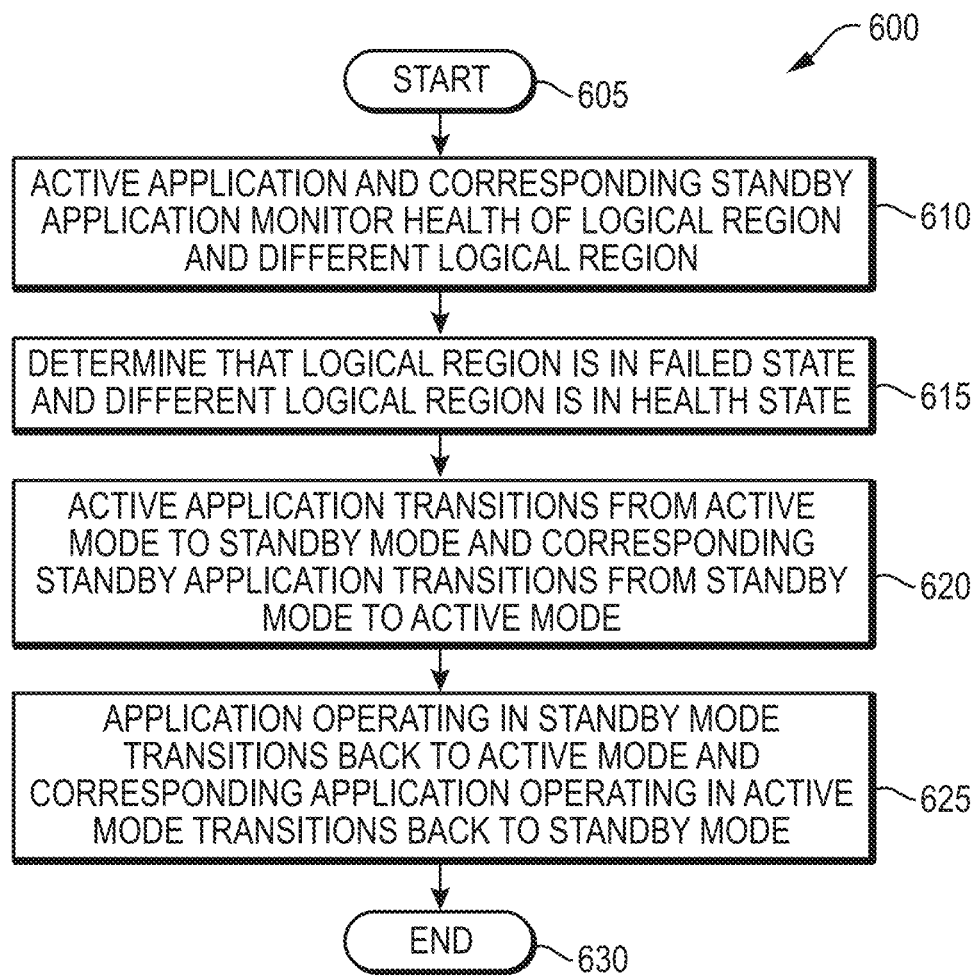
FIG. 6 is a flow diagram of a sequence of steps for an active application and a standby application simultaneously switching modes when a logical region fails according to the one or more embodiments as described herein.

FIG. 6 is a flow diagram of a sequence of steps for an active application and a standby application simultaneously switching modes when a logical region fails according to the one or more embodiments as described herein. Procedure 600 starts at step 605 and continues to step 610. At step 610, an active application and its corresponding standby application monitor the health of a logical region and a different logical region. In an embodiment, the logical region corresponds to the logical region the active application is actively communicating with and the different logical region corresponds to the logical region the standby application is operating in standby mode with. For example, producer application 310A is an active application actively communicating with logical region 1 as depicted in FIG. 7. Further, producer application 320B is the standby application for producer application 310A and is operating in standby mode with logical region 2 as depicted in FIG. 7. Therefore, and in this example, logical region 1 is the logical region and logical region 2 is the different logical region.

Producer application 310A and producer application 320B may each monitor the health of logical region 1 and logical region 2 by polling health status applications 125A and 125B as described herein.

The procedure continues from step 610 to step 615. At step 615, the active application and its corresponding standby application determine that the logical region is in a failed state and the different logical region is in a healthy state. For example, producer application 310A and producer application 320B may determine that logical region 1 is in a failed state if a heartbeat message is not received in a predetermined amount of time from health status application 125A. Further, producer application 310A and producer application 320B may determine that logical region 2 is in a healthy state if a heartbeat message is received in a predetermined amount of time from health status application 125B.

The procedure continues from step 615 to step 620. At step 620, the active application transitions to standby mode and the corresponding standby application transitions to active mode. In an embodiment, the active application and the corresponding standby application transition to the different mode simultaneously. Continuing with the example, producer application 310A transitions from active mode to standby mode as described above in relation to the flow diagram of FIG. 5. Further, producer application 320B transitions from standby mode to active mode as described above in relation to the flow diagram of FIG. 4. FIG. 9 illustrates producer application 310A transitioned to standby mode and producer application 320B transitioned to active mode.

The procedure continues from step 620 to step 625. At step 625, the application operating in standby mode transitions back to active mode and the corresponding application operating in active mode transitions back to standby mode. Continuing with the example, and as depicted in FIG. 9, producer application 310A operates in standby mode with logical region 1 when logical region 1 fails. Further, and as depicted in FIG. 9, producer application 320B operates in active mode and actively communicates with brokers of logical region 2 when logical region 1 fails. Therefore, producer application 310A transitions back to active mode as depicted in FIG. 7 when, for example, producer application 310A receives a heartbeat message from health status application 125A in a predetermined amount of time. Further, producer application 320B transitions back to standby mode as depicted in FIG. 7 when, for example, producer application 320B receives a heartbeat message from health status application 125A in a predetermined amount of time. Procedure 600 then ends at step 630.

It should be understood that a wide variety of adaptations and modifications may be made to the techniques. For example, the steps of the flow diagrams as described herein may be performed sequentially, in parallel, or in one or more varied orders. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Additionally, it should be understood that the term user and customer may be used interchangeably. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A computer-implemented method for performing a failover technique for one or more data streaming applications in a cloud computing environment, the computer-implemented method comprising:
    monitoring, by a first health status application executed by a processor, a first health of a first logical region that corresponds to a first physical region, wherein the first logical region includes a plurality of first data centers each including at least one first server that handles first data communications for first streaming applications;
    monitoring, by a second health status application, a second health of a second logical region, wherein the second logical region corresponds to a second physical region and includes a plurality of second data centers each including at least one second server that handles second data communications for second streaming applications, wherein the first logical region is different from the second logical region;
    polling, by standby first streaming applications that interact with the second logical region, the first health status application for the first health of the first logical region and second health status application for the second health of the second logical region, wherein the first health status application and the second health status application execute on computing devices that are external to the first logical region and the second logical region;
    determining, by the standby first streaming applications, that the first logical region is in a failed state based on polling the first health status application and the second logical region is in a healthy state based on polling the second health status application, wherein the failure of the first logical region indicates a region failure event; and
    executing, in response to the region failure event determined by the standby first streaming applications, the failover technique by having the standby first streaming applications perform third data communications with at least one particular second server, wherein the standby first streaming applications do not perform the third data communications prior to the region failure event.

2. The computer-implemented method of claim 1, further comprising:
    performing a failback to the first streaming applications that perform the first data communications and stopping the standby first streaming applications from performing the third data communications when the standby first streaming applications determine that the first logical region is in a healthy state based on the polling.

3. The computer-implemented method of claim 1, further comprising:
   polling, by the first streaming applications that interact with the first logical region, the first health status application for the first health of the first logical region; and
   transitioning from an active mode to a standby mode by the first streaming applications when the first streaming applications determine that the first logical region is in the failed state.

4. The computer-implemented method of claim 1, wherein when polling the first health status application and the second health status application by a particular standby first streaming application, further comprising:
   sending a first polling request, by the particular standby first streaming application, to the first health status application;
   determining, by the particular standby first streaming application, that the first logical region is in the healthy state when a first heartbeat message is received from the first health status application within a first predefined time period;
   determining, by the particular standby first streaming application, that the first logical region is in the failed state when the first heartbeat message is not received from the first health status application within the first predefined time period;
   sending a second polling request, by the particular standby first streaming application, to the second health status application;
   determining, by the particular standby first streaming application, that the second logical region is in the healthy state when a second heartbeat message is received from the second health status application within a second predefined time period; and
   determining, by the particular standby first streaming application, that the second logical region is in the failed state when the second heartbeat message is not received from the second health status application within the second predefined time period.

5. The computer-implemented method of claim 1, wherein the first streaming applications include a producer application and a consumer application, the method further comprising:
   receiving, by a particular first server of the plurality of first data centers, a message from the producer application and for a topic; and
   retrieving, by the consumer application, the message for the topic from the at least one particular second server.

6. The computer-implemented method of claim 1, wherein each of the standby first streaming applications is a warm application that is (1) initialized or executing and not actively accepting or processing traffic, (2) in a standby mode, or (3) in a dormant state.

7. The computer-implemented method of claim 1, further comprising:
   embedding, within a particular first streaming application, a portion of code that identifies at least the second logical region and the at least one particular second server of a particular second data center for the failover technique;
   executing the particular first streaming application; and
   in response to the executing, initializing a particular standby first streaming application that is in a standby mode for interacting with the at least one particular second server of the particular second data center for the failover technique.

8. The computer-implemented method of claim 1, further comprising:
   implementing, before executing the failover technique, one or more application recovery techniques for the first streaming applications within a predetermined amount of time;
   in response to receiving a health status message within the predetermined amount of time by the first streaming applications, determining that the first logical region is in a healthy state; and
   in response to not receiving the health status message within the predetermined amount of time by the first streaming applications, determining that the first logical region is still in the failed state and continue to execute the failover technique.

9. A cloud computing system for performing a failover technique for one or more data streaming applications in a cloud computing environment, the cloud computing system comprising:
   a first logical region that corresponds to a first physical region, wherein the first logical region includes a plurality of first data centers each including at least one first server that handles first data communications for first streaming applications;
   a second logical region corresponds to a second physical region, wherein the second logical region includes a plurality of second data centers each including at least one second server that handles second data communications for second streaming applications;
   a first health status application executed by one or more processor external to the first logical region and the second logical region, the first health status application configured to monitor the health of the first logical region;
   a second health status application executed by the one or more processor external to the first logical region and the second logical region, the second health status application configured to monitor the health of the second logical region;
   standby first streaming applications interacting with the second logical region and configured to:
      poll the first health status application for a first health of the first logical region;
      poll the second health status application for a second health of the second logical region;
      execute, in response determining that the first logical region is in a failed state based on polling the first health status application and the second logical region is in a healthy state based on polling the second health status application, the failover technique by performing third data communications with at least one particular second server of the second logical region, and
         wherein the standby first streaming applications do not perform the third data communications prior to determining that the first logical region is in the failed state and the second logical region is in the healthy state.

10. The cloud computing system of claim 9, wherein
the standby first streaming applications further configured to:
   determine, after executing the failover technique, that the first logical region is in the healthy state based on the polling; and
   transition the standby first streaming application from performing data communications to a standby mode; and the first streaming applications further configured to:
    determine, after executing the failover technique, that the first logical region is in the healthy state based on the polling; and
    transition the first streaming applications from the standby mode to performing the first data communications as part of a failback.

11. The cloud computing system of claim 9, the first streaming application are configured:
    poll the first health status application for the first health of the first logical region; and
    transition from an active mode to a standby mode when it is determined that the first logical region is in the failed state based on the polling.

12. The cloud computing system of claim 9, wherein when polling the first health status application and the second health status application by a particular standby first streaming application, the particular standby first streaming application configured to:
    send a first polling request to the first health status application;
    determine that the first logical region is in the healthy state when a first heartbeat message is received from the first health status application within a first predefined time period;
    determine that the first logical region is in the failed state when the first heartbeat message is not received from the first health status application within the first predefined time period;
    send a second polling request to the second health status application;
    determine that the second logical region is in the healthy state when a second heartbeat message is received from the second health status application within a second predefined time period; and
    determine that the second logical region is in the failed state when the second heartbeat message is not received from the second health status application within the second predefined time period.

13. The cloud computing system of claim 9, wherein the first streaming applications include a producer application and a consumer application, and wherein
    a first particular first server of the plurality of first data centers configured to receive a message from the producer application and for a topic; and
    the consumer application is configured to retrieve the message for the topic from the at least one particular second server.

14. The cloud computing system of claim 9, wherein each of the standby first streaming applications is a warm application that is (1) initialized or executing and not actively accepting or processing traffic, (2) in a standby mode, or (3) in a dormant state.

15. The cloud computing system of claim 9, wherein a particular first streaming application includes an embedded code portion that identifies at least the second logical region and the at least one particular second server of a particular second data center for the failover technique, and wherein a particular standby first streaming application is configured to, in response to executing the first particular streaming application, initialize in a standby mode for interacting with the at least one particular second server of the particular second data center for the failover technique.

16. A computer-implemented method for performing a failover technique for one or more data streaming applications in a cloud computing environment, the computer-implemented method comprising:
    monitoring, by a first health status application executed by a processor, a first health of a first logical region that corresponds to a first physical region, wherein the first logical region includes a plurality of first data centers each including at least one first server that handles first data communications for first streaming applications that are in an active mode;
    monitoring, by a second health status application, a second health of a second logical region that corresponds to a second physical region, wherein the second logical region includes a plurality of second data centers each including at least one second server that handles second data communications for second streaming applications that are in the active mode, wherein the first health status application and second health status application are external to the first logical region and the second logical region;
    polling by a standby application in a standby mode for interacting with the second logical region, the first health status application for the first health of the first logical region;
    polling by the standby application in a standby mode for interacting with the second logical region, the second health status application for the second health of the second logical region;
    determining, based on the polling of the first health status application and the second health status application, that the first logical region is in a failed state and the second logical region is in a healthy state; and
    transitioning the standby application from the standby mode to the active mode when the standby application determine that the first logical region is in the failed state and the second logical region is in the healthy state, wherein the standby application does not perform the third data communications prior to determining that the first logical region is in the failed state and the second logical region is in the healthy state.

17. The method of claim 16, transitioning the first streaming applications from the active mode to the standby mode when the first streaming applications determine that the first logical region is in the failed state.

18. The method of claim 16, further comprising executing a failover technique when the first logical region is determined to transition from the failed state to the healthy state, wherein the failover technique comprise transitioning the standby application from the standby mode to the active mode.

19. The method of claim 16, wherein the standby application is a warm application that is (1) initialized or executing and not actively accepting or processing traffic, (2) in a standby mode, or (3) in a dormant state.

20. The method of claim 16, wherein the first streaming applications include a producer application and a consumer application, the method further comprising:
    receiving, by a particular first server of the plurality of first data centers, a message from the producer application and for a topic; and
    retrieving, by the consumer application, the message for the topic from a particular second server.

* * * * *